(12) United States Patent
Shiomi

(10) Patent No.: US 10,601,154 B2
(45) Date of Patent: Mar. 24, 2020

(54) ELECTRICAL JUNCTION BOX

(71) Applicant: Sumitomo Wiring Systems, Ltd., Yokkaichi, Mie (JP)

(72) Inventor: Teppei Shiomi, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 16/349,677

(22) PCT Filed: Nov. 2, 2017

(86) PCT No.: PCT/JP2017/039742
§ 371 (c)(1),
(2) Date: May 14, 2019

(87) PCT Pub. No.: WO2018/096906
PCT Pub. Date: May 31, 2018

(65) Prior Publication Data
US 2019/0319377 A1     Oct. 17, 2019

(30) Foreign Application Priority Data

Nov. 22, 2016 (JP) ................................. 2016-226544

(51) Int. Cl.
*H01R 9/18* (2006.01)
*B60R 16/023* (2006.01)
*H02G 3/08* (2006.01)

(52) U.S. Cl.
CPC ............ *H01R 9/18* (2013.01); *B60R 16/0239* (2013.01); *H02G 3/081* (2013.01)

(58) Field of Classification Search
CPC ....... H01R 9/18; B60R 16/0239; H02G 3/081
(Continued)

(56) References Cited

U.S. PATENT DOCUMENTS 5,715,135 A * 2/1998 Brussalis ............ B60R 16/0238
361/622
6,077,102 A * 6/2000 Borzi .................... H01R 9/2458
439/364
(Continued)

FOREIGN PATENT DOCUMENTS

JP      H6-023171 U     8/1992
JP      2016-096653 A   5/2016

OTHER PUBLICATIONS

International Search Report, Application No. PCT/JP2017/039742, dated Nov. 28, 2017. ISA/Japan Patent Office.

*Primary Examiner* — Timothy J Thompson
*Assistant Examiner* — Michael F McAllister
(74) *Attorney, Agent, or Firm* — Honigman LLP

(57) ABSTRACT

Provided is an electrical junction box having a highly versatile novel structure such that external wires can be connected thereto from multiple directions. An electrical junction box includes cases in which a circuit member is disposed, and the cases include an external-wire fastening part in which a connection part provided on the circuit member is exposed, and to which a connection terminal provided at an end of an external wire is to be fastened and fixed. The external-wire fastening part includes a fastener that is used to fasten and fix the connection terminal to the connection part, and the external-wire fastening part has a plurality of fastening points whose normals that extend from the central axis of the fastener to a peripheral wall of the cases have the same length, the plurality of fastening points being oriented in different directions.

4 Claims, 5 Drawing Sheets

(58) Field of Classification Search
USPC .................................................. 174/541, 520
See application file for complete search history.

(56) References Cited

U.S. PATENT DOCUMENTS

| | | | | |
|---|---|---|---|---|
| 6,570,088 B1 * | 5/2003 | Depp | ................... | B60R 16/0238 174/50 |
| 6,679,708 B1 * | 1/2004 | Depp | ................... | H01R 9/2466 361/752 |
| 9,787,074 B1 * | 10/2017 | Matsumura | .............. | H02G 3/16 |
| 2008/0149387 A1 * | 6/2008 | Oda | ....................... | H05K 7/026 174/520 |

* cited by examiner

ELECTRICAL JUNCTION BOX

CROSS-REFERENCE TO RELATED APPLICATIONS

This application is the U.S. national stage of PCT/JP2017/039742 filed on Nov. 2, 2017, which claims priority of Japanese Patent Application No. JP 2016-226544 filed on Nov. 22, 2016, the contents of which are incorporated herein.

TECHNICAL FIELD

The present disclosure relates to an electrical junction box provided with an external-wire fastening part.

BACKGROUND

Conventionally, as electrical junction boxes for installation in a vehicle or the like, electrical junction boxes are known that have a case in which a circuit member is disposed, the case being provided with, on the surface thereof, an external-wire fastening part in which a connection part provided on the circuit member is exposed. For example, as disclosed in JP 2016-96653A (JP2016-96653A), a connection terminal provided on an end of an external wire through which power is input/output is fastened and fixed to this external-wire fastening part via a fastener such as a bolt or a nut.

Meanwhile, it is easily anticipated that, due to a recent increase in types of vehicles, a connection terminal needs to be fastened and fixed to the external-wire fastening part of the electrical junction box from multiple connection directions. In an electrical junction box having the conventional configuration as shown in FIG. 3 of JP2016-96653A, the number of connection directions in which an external wire is connected is limited to one, namely, a length direction. Therefore, if the routing direction of an external wire is different depending on the type of vehicle, design change is required such as moving the position at which the external-wire fastening part of the electrical junction box is arranged to another position on a side wall, resulting in an increase in cost.

On the other hand, it is also conceivable to use an external wire having an extra length so that the external wire is detoured and is fastened to the external-wire fastening part. However, this is not a desirable measure because the external wire having excessive length may generate excessive resistance on an input/output line, cause an increase in cost due to the excessive length of the wire, and generate an interference with another member.

The present disclosure was made in view of the aforementioned circumstances, and the problem to be solved is to provide an electrical junction box having a highly versatile novel structure such that external wires can be connected thereto from multiple directions.

SUMMARY

According to a first aspect of the present disclosure, an electrical junction box has a case in which a circuit member is disposed, the case being provided with at least one external-wire fastening part in which a connection part provided on the circuit member is exposed, and to which a connection terminal provided at an end of an external wire is to be fastened and fixed, wherein the at least one external-wire fastening part has a fastener that is used to fasten and fix the connection terminal to the connection part, the at least one external-wire fastening part has a plurality of fastening points whose normals that extend from a central axis of the fastener to a peripheral wall of the case have the same length, the plurality of fastening points being oriented in different directions, and a plurality of the connection terminals oriented in different directions are to be fastened and fixed to the at least one external-wire fastening part.

With this aspect, the external-wire fastening part has a fastener that is used to fasten and fix the connection terminal to the connection part, and the external-wire fastening part has a plurality of fastening points whose normals that extend from a central axis of the fastener to a peripheral wall of the case have the same length, the plurality of fastening points being oriented in different directions. Accordingly, the direction in which the external wire is connected when the connection terminal of the external wire is fastened and fixed to the external-wire fastening part is not limited to one direction as in the conventional structure, and the external wire can be fastened from multiple directions. Therefore, even if the connection direction of an input/output wire is different depending on the type or a difference in grade of vehicle, or the like, it is possible to connect the external wire from multiple directions, without the need to change the connection terminal provided at an end of the external wire or change the position at which the external-wire fastening part of the electrical junction box is arranged, resulting in an improvement in the versatility of the electrical junction box.

Furthermore, since connection terminals of a plurality of external wires can be fastened to one external-wire fastening part from different directions, it is possible to advantageously prevent the plurality of external wires from overlapping each other in their wire portions and crimped portions. This makes it possible to advantageously realize reliable fastening and fixing of the connection terminals of the plurality of external wires.

Note that a bolt or a nut, for example, may be used as the fastener arranged in the external-wire fastening part.

According to a second aspect of the present disclosure, the electrical junction box according to the first aspect may be such that the external-wire fastening part is provided in a corner of the case, the corner is defined by a first side wall and a second side wall that constitute the peripheral wall of the case, and two fastening points are provided as a result of the normals respectively extending from the central axis of the fastener to the first side wall and the second side wall being equal to each other.

With this aspect, by providing the external-wire fastening part in a corner of the case, it is possible to provide the fastening points on two respective side walls, namely, the first side wall and the second side wall that constitute the corner of the case. Accordingly, it is possible to use the rigidity of the corner to form the plurality of fastening points with superior durability. Furthermore, since the orientations of the two fastening points can be made relatively greatly different from each other, it is possible to advantageously realize connection of external wires from a wide range of directions. Note that the angle at which the first side wall and the second side wall intersect with each other may be any angle as long as a corner can be defined, without being limited to 90 degrees, and may be an angle that is more obtuse or acute than 90 degrees.

According to a third aspect of the present disclosure, the electrical junction box according to the first or second aspect may be such that the external-wire fastening part includes a partition protrusion that is located between the plurality of fastening points, and protrudes upward from the connection part.

With this aspect, since the external-wire fastening part includes a partition protrusion protruding upward from the connection part between the fastening points, when mounting the connection terminal of the external wire to a predetermined fastening point, the connection terminal abuts against the partition protrusion when being fastened, which prevents excessive rotation of the connection terminal, and thus the connection terminal can be easily and reliably confined in an orientation direction of the corresponding fastening point.

Advantageous Effects of Disclosure

According to the present disclosure, the external-wire fastening part has the fastener that is used to fasten and fix a connection terminal to the connection part, and the external-wire fastening part has the plurality of fastening points whose normals that extend from the central axis of the fastener to the peripheral wall of the case have the same length, the plurality of fastening points being oriented in different directions. Accordingly, the connection direction of an external wire is not limited to one direction as in the conventional structure, and the external wire can be fastened from multiple directions. Therefore, even if the connection direction of an input/output wire is different depending on the type of vehicle, it is possible to connect the external wire from multiple directions, without the need to change the connection terminal or change the position at which the external-wire fastening part is arranged, resulting in an improvement in the versatility of the electrical junction box. Furthermore, since connection terminals of a plurality of external wires can be fastened to one external-wire fastening part from different directions, it is possible to advantageously prevent the plurality of external wires from overlapping each other in their wire portions and crimped portions. This makes it possible to advantageously realize reliable fastening and fixing of the connection terminals of the plurality of external wires.

DETAILED DESCRIPTION OF PREFERRED EMBODIMENTS

Hereinafter, embodiments of the present disclosure will be described with reference to the drawings.

FIGS. 1 to 6 show an electrical junction box 10 according to a first embodiment of the present disclosure. The electrical junction box 10 includes a lower case 12 and an upper case 14 that constitute a case, and has a configuration in which the surface of the lower case 12 is covered by the upper case 14. Also, the lower case 12 and the upper case 14 that constitute the case are provided with busbars 16 serving as circuit members. Here, the lower case 12 and the upper case 14 are both formed as a single body, for example, through injection molding or the like using a synthetic resin such as polypropylene (PP) resin or polyamide (PA) resin. On the other hand, the busbars 16 are formed such that a metal plate made of copper, a copper alloy, or the like is pressed, punched, and bent, for example, and the shape of the busbars 16 is set to a suitable one, taking the circuit layout shape or the like into consideration. Note that, in the following description, "upper" refers to the upper side of FIG. 1, "lower" refers to the lower side of FIG. 1, "front" refers to the left side of FIG. 2, and "rear" refers to the right side of FIG. 2.

Figure 1:
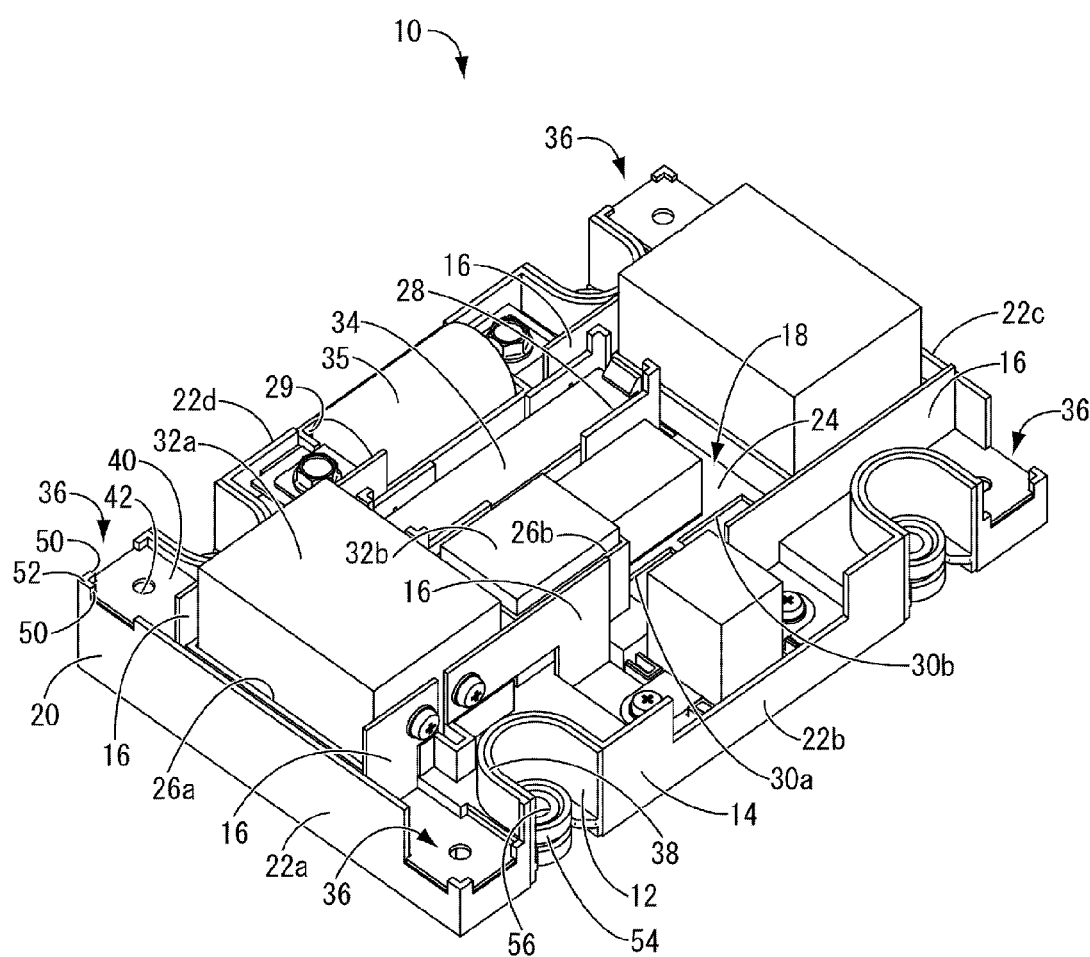
FIG. 1 is a perspective view illustrating an electrical junction box according to a first embodiment of the present disclosure.
Figure 2:
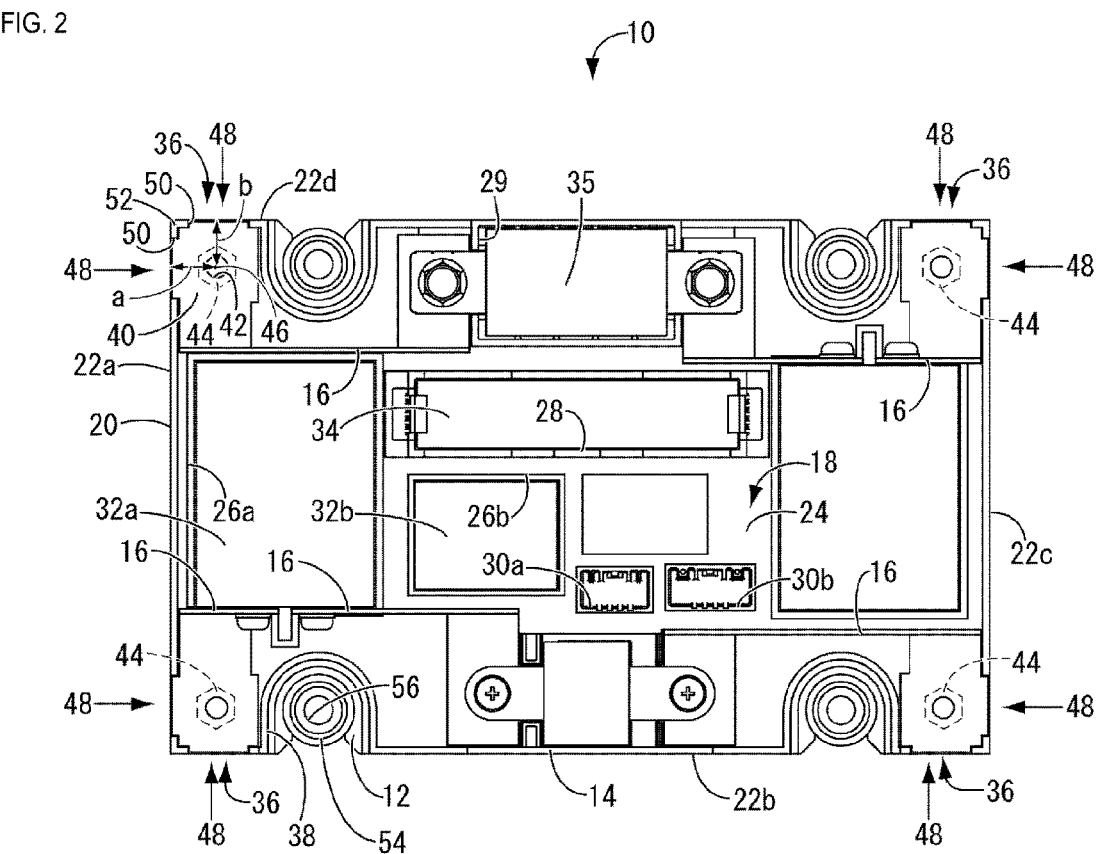
FIG. 2 is a plan view of the electrical junction box shown in FIG. 1.

As shown in FIGS. 1 and 2, the upper case 14 is substantially box-shaped opening downward, with a peripheral wall 20 protruding downward, the peripheral wall 20 being provided at an outer peripheral edge of an upper wall 18 in the shape of a substantially laterally elongated rectangular plate. This peripheral wall 20 includes four side walls 22a to 22d. Various types of relay mounting parts 26a and 26b, a resistor mounting part 28, a fuse mounting part 29, and various types of connector mounting parts 30a and 30b protrude from an upper surface 24 of the upper wall 18 of the upper case 14, so that various types of relays 32a and 32b, a resistor 34, a fuse 35, and not-shown various types of connectors are to be mounted thereon. Furthermore, the upper wall 18 of the upper case 14 is provided with, in four corners thereof, external-wire fastening parts 36 to each of which a connection terminal 62 provided at an end of a later-described external wire 58 is to be fastened and fixed, the external-wire fastening parts 36 being substantially rectangular when viewed in a plan view. Furthermore, the upper wall 18 of the upper case 14 is provided with, at positions slightly inward of the four corners in a longitudinal direction (left-right direction in FIG. 2), cut-out portions 38 that have a substantially U-shape when viewed in a plan view, and into which not-shown bolts for fixing the electrical junction box 10 of the present disclosure to, for example, a predetermined position in a not-shown vehicle can be inserted.

More specifically, each external-wire fastening part 36 includes a connection part 40 arranged at one end of a busbar 16 while being exposed, the connection part 40 being substantially rectangular when viewed in a plan view, and the connection part 40 has, in a central portion thereof, a bolt insertion hole 42 having a substantially circular cross-sectional shape while penetrating the connection part 40 in a plate-thickness direction (up-down direction in FIG. 1). Furthermore, as will be described later, in a region of the lower case 12 that corresponds to the external-wire fastening part 36, a nut 44 serving as a fastener that is used to fasten and fix the connection terminal 62 of the external wire 58 to the connection part 40 is arranged immediately beneath the connection part 40 such that the bolt insertion hole 42 of the connection part 40 is coaxial with a central axis 46 of the nut 44. Note that the nuts 44 are illustrated by dotted lines only in FIG. 2 for ease of understanding.

Furthermore, as shown in FIG. 2, taking the corner on the front and far side (upper left corner in FIG. 2) as an example, the external-wire fastening part 36 has a corner constituted by the side wall 22a, serving as a first side wall, and the side wall 22d, serving as a second side wall, that constitute the peripheral wall 20 of the upper case 14, and has a configuration in which a length a of a normal extending from the central axis 46 of the nut 44 serving as a fastener to the side wall 22a is equal to a length b of a normal extending from the central axis 46 to the side wall 22d. Accordingly, two fastening points 48 are provided that are oriented in different directions so that the later-described external wire 58 can be connected from the front side and a far side (from the left side and the upper side of FIG. 2). In addition, the external-wire fastening part 36 has, at the two fastening points 48, cut-out portions 50 that are open in the upward direction, and a longitudinal direction (left-right direction in FIG. 2) or a width direction (up-down direction in FIG. 2), as a result of the upper ends of the side wall 22a and the side wall 22d being cut out in a substantially rectangular cross-sectional shape to the extent that the cut-out portions 50 reach the upper surface 24 of the upper wall 18 of the upper case 14. With these cut-out portions 50, a partition protrusion 52 is provided protruding between the two fastening points 48, the partition protrusion 52 being substantially hook-shaped when viewed in a plan view and protruding upward from the connection part 40.

On the other hand, as shown in FIGS. 1 and 2, the lower case 12 has substantially the same shape as that of the upper case 14 when viewed in a plan view, and the surface of the lower case 12 is covered almost completely by the upper case 14 when they are assembled. Note that the lower case 12 as a whole has the shape of a substantially laterally elongated rectangular block, although illustration thereof is omitted, and the lower case 12 is provided with, on the surface thereof, busbars 16 constituting an inner circuit, the lower case 12 having a configuration with connection terminals to be connected to tab terminals protruding from the connector mounting parts 30a and 30b and tab terminals of the relays 32a and 32b and the resistor 34. In addition, the lower case 12 has, at positions slightly inward of the four corners of the lower case 12 in a longitudinal direction (left-right direction in FIG. 2), fixing parts 54 in the shape of a substantially circular tube, the fixing parts 54 being used to fix the electrical junction box 10 of the present disclosure to a predetermined position in the not-shown vehicle for example, and being arranged inside the respective cut-out portions 38 of the upper case 14. Each fixing part 54 has, in the central portion thereof, a bolt insertion hole 56 that has a substantially circular cross-sectional shape and penetrates the lower case 12 in the up-down direction.

Figure 3:
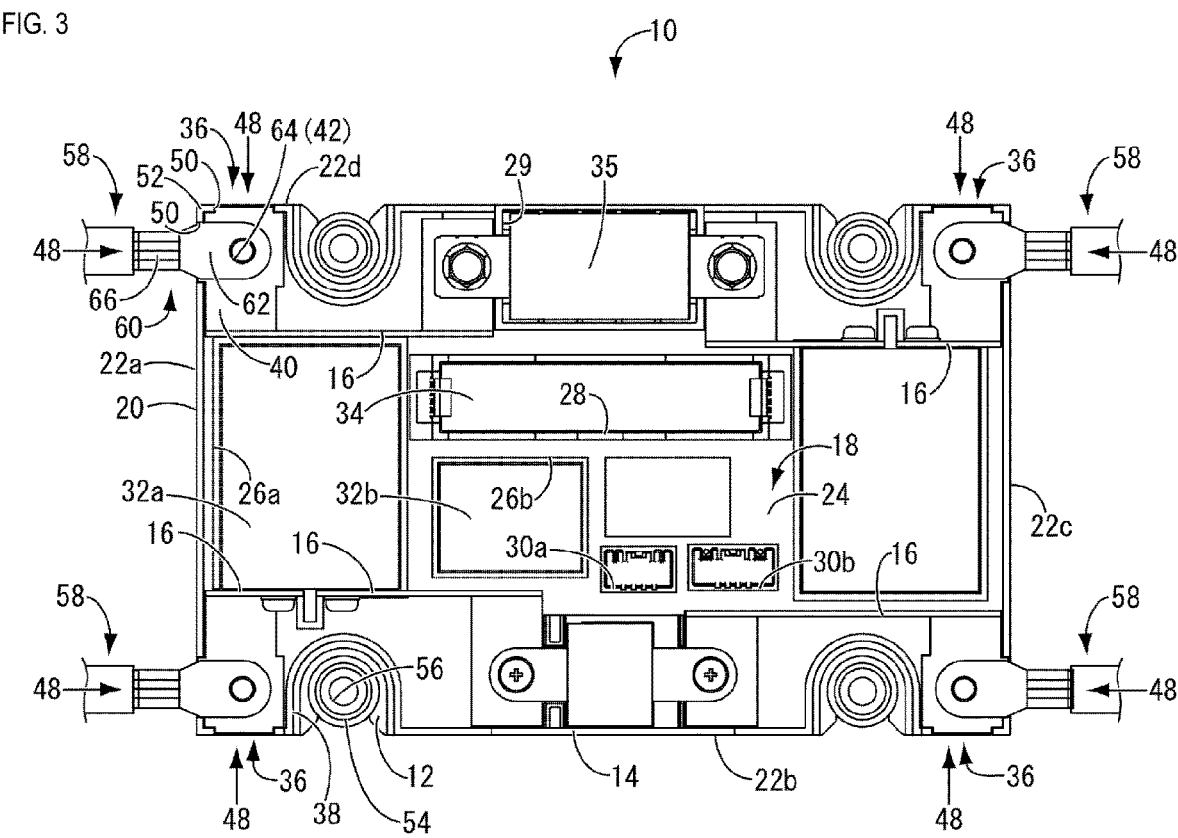
FIG. 3 is a plan view illustrating a state in which connection terminals provided at ends of external wires are arranged in external-wire fastening parts of the electrical junction box shown in FIG. 2.
Figures 4, 5:
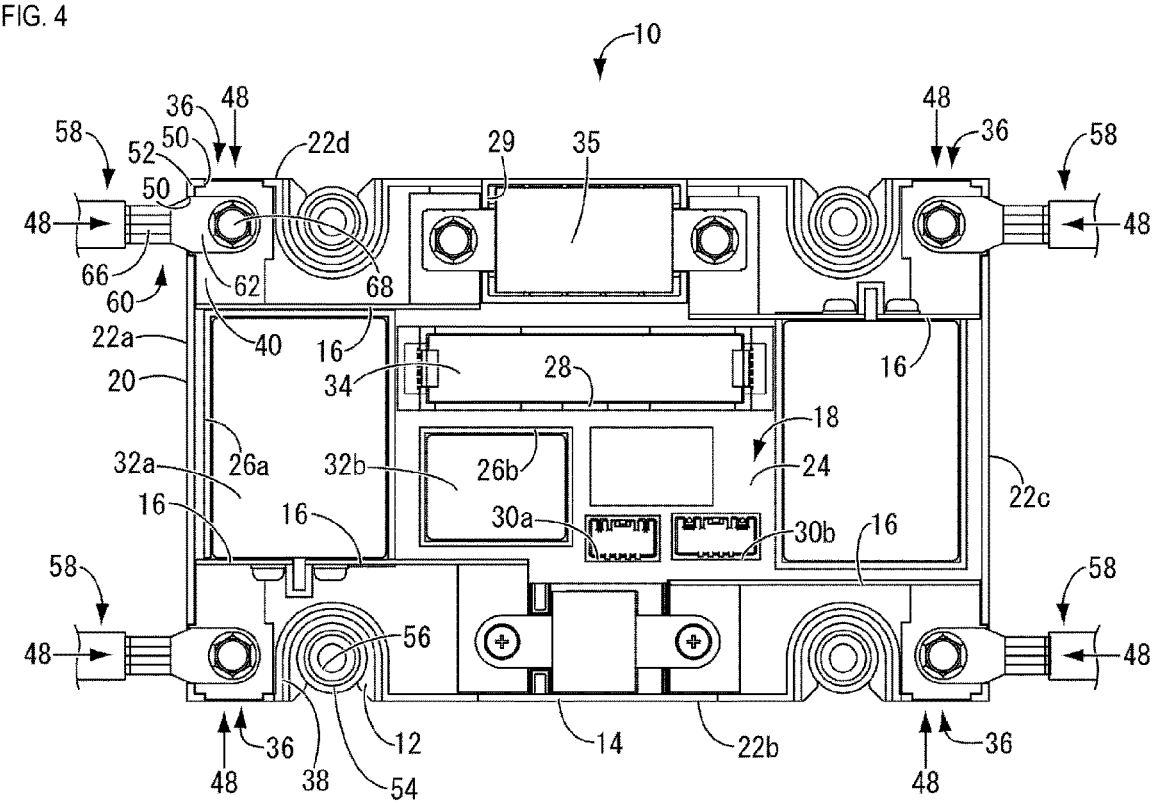
FIG. 4 is a plan view illustrating a state in which the connection terminals shown in FIG. 3 are fastened and fixed to the external-wire fastening parts.
FIG. 5 is a plan view corresponding to FIG. 4, illustrating another aspect of connection direction of the external wires in the present embodiment.

Also, as shown in FIGS. 3 and 4, connection terminals 62 of crimp terminals 60 provided at ends of the external wires 58 are fastened and fixed to the external-wire fastening parts 36 of the thus-configured electrical junction box 10 of the present disclosure. More specifically, the external wires 58 have a structure in which a core wire obtained by bundling together a plurality of conductors, namely, metal wires made of copper, aluminum, or the like is covered by an electrically insulating coating made of an ethylene system resin or a styrene system resin. Furthermore, each crimp terminal 60 is made of a metal piece in the shape of a substantially rectangular flat plate, and has, at a leading end thereof, the connection terminal 62 with a bolt insertion hole 64, and, on the base end portion of the crimp terminal 60, a core wire-crimped portion 66 to which the core wire extending from the end of the external wire 58 is crimped and connected.

First, as shown in FIG. 3, the connection terminals 62 provided at the ends of the thus-configured external wires 58 are arranged at the fastening points 48 extending in the longitudinal direction (left-right direction in FIG. 3) of the external-wire fastening parts 36 of the electrical junction box 10, so that the bolt insertion holes 64 formed in the connection terminals 62 respectively overlap with the bolt insertion holes 42 formed in the connection parts 40 exposed on the external-wire fastening parts 36 (see FIG. 3). Then, as shown in FIG. 4, by inserting the bolts 68 into the bolt insertion holes 42 and 64 and screwing them with the nuts 44 arranged on the lower case 12, the connection terminals 62 provided at the ends of the external wires 58 are fastened and fixed to the connection parts 40 exposed on the external-wire fastening parts 36. Note that instead of fastening and fixing, as shown in FIGS. 3 and 4, the connection terminals 62 of the external wires 58 only to the fastening points 48 extending in the longitudinal direction (left-right direction in FIGS. 3 and 4), it is also possible to fasten and fix, as shown in FIG. 5, some connection terminals 62 (two connection terminals on the upper side of FIG. 5) of the external wires 58 to the fastening points 48 extending in the width direction (up-down direction in FIG. 5). In other words, the connection terminal 62 of an external wire 58 may be fastened and fixed to any of the two fastening points 48 of each external-wire fastening part 36.

According to the electrical junction box 10 having such a structure, in each external-wire fastening part 36, a connection part 40 provided at an end of a busbar 16 is placed on a nut 44 arranged on the lower case 12 while being exposed to the upper side, and the external-wire fastening part 36 has a configuration in which the lengths a and b of the normals extending from the central axis 46 of the nut 44 to the peripheral walls 20 (for example, the side walls 22a and 22d) of the upper case 14 are equal to each other. Accordingly, two fastening points 48 can be realized that allow two different connection directions of the connection terminal 62 of the external wire 58 to be fastened and fixed to the external-wire fastening part 36 (for example, the upper direction and the left direction with respect to the upper left external-wire fastening part 36 shown in FIG. 2). Accordingly, when the connection terminals 62 provided at the ends of the external wires 58 are fastened and fixed to the external-wire fastening parts 36, the present disclosure is not limited to use of the fastening points 48 extending only in one direction, namely, the longitudinal direction (left-right direction in FIG. 4) as in the conventional one, but a configuration is also possible in which some connection terminals 62 (two connection terminals on the upper side of FIG. 5) of the external wires 58 can be fastened and fixed to the fastening points 48 extending in the width direction (in the up-down direction in FIG. 5). In other words, in the present embodiment, in each of the external-wire fastening parts 36, the connection terminal 62 of the external wire 58 may be fastened and fixed to any of two fastening points 48. Accordingly, even if the connection direction of an input/output wire serving as the external wire 58 is different depending on the type of vehicle, it is possible to connect the connection terminal 62 of the external wire 58 to the external-wire fastening part 36 from two directions, without changing the shape of the connection terminal of the external wire 58 or changing the direction in which the fastening point of the external-wire fastening part extends, thus making it possible to improve the versatility of the electrical junction box 10.

Furthermore, in the present embodiment, as a result of each external-wire fastening part 36 being provided in a corner of the cases 12 and 14, two side walls, for example, the side wall 22a serving as the first side wall, and the side wall 22d serving as the second side wall that constitute a corner of the cases 12 and 14 can be respectively provided with the fastening points 48. Accordingly, it is possible to use the rigidity of the corner to form the two fastening points 48 with superior durability. Moreover, it is possible to form the two fastening points 48 such that their extending directions are orthogonal to each other, and thus it is possible to advantageously realize connection between the external wire 58 and the external-wire fastening part 36 from a wide range of directions.

In addition, the external-wire fastening part 36 includes, between the two fastening points 48, the partition protrusion 52 protruding upward from the connection part 40. Accordingly, the connection terminal 62 of the external wire 58 abuts against the partition protrusion 52 when being fastened and fixed, which prevents excessive rotation of the connection terminal 62, and thus the fastened and fixed connection terminal 62 of the external wire 58 can be easily and reliably confined in a predetermined connection direction.

Figure 6:
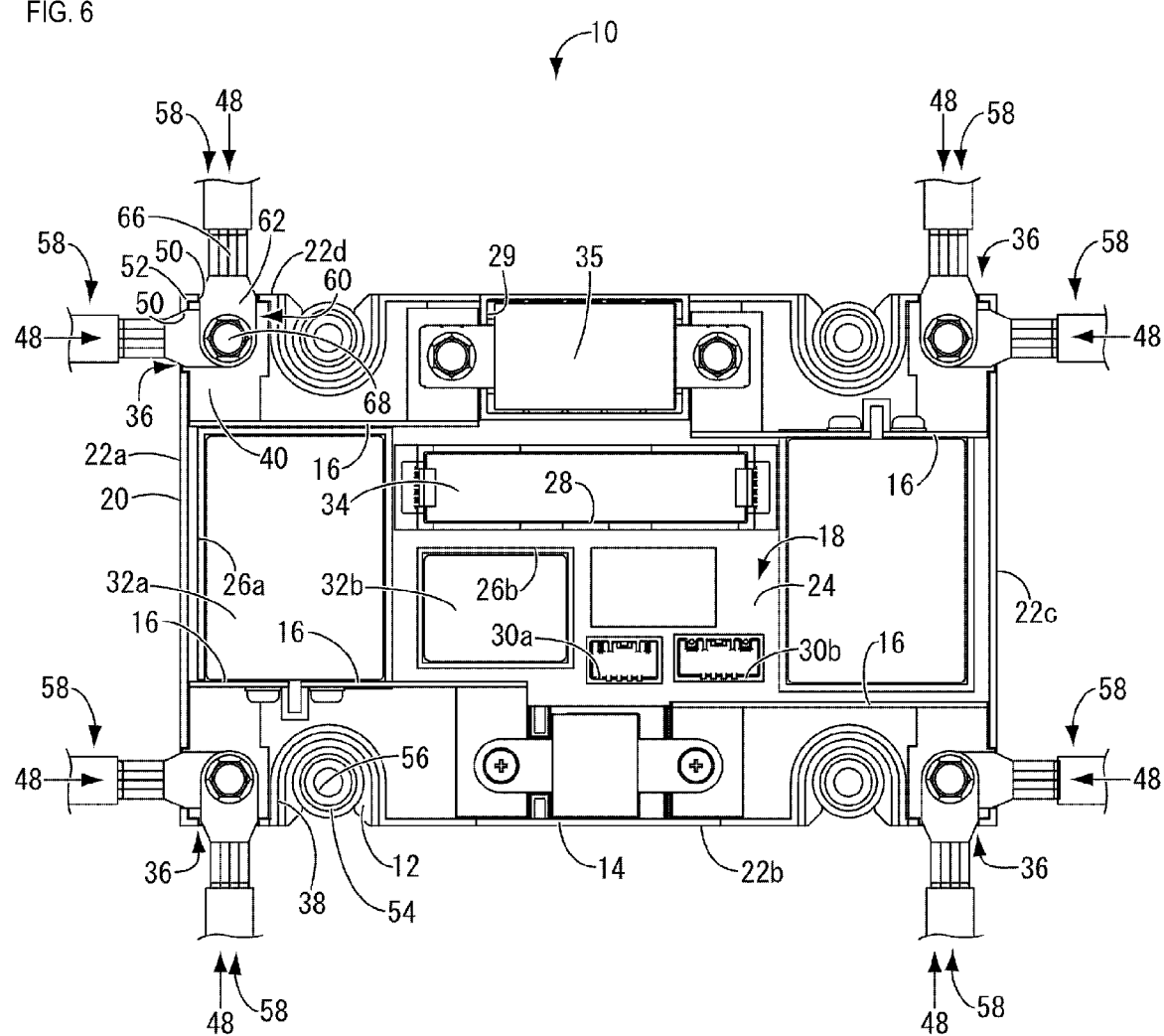
FIG. 6 is a plan view corresponding to FIG. 4, illustrating another aspect of the connection of the external wires in the present embodiment.

The embodiment of the present disclosure has been described in detail, but the present disclosure is not limited by the detailed description. For example, in the first embodiment, the connection terminal 62 of one external wire 58 is fastened and fixed to one external-wire fastening part 36, but as shown in FIG. 6, the connection terminals 62 of external wires 58 may also be fastened and fixed to one external-wire fastening part 36 via two fastening points 48 thereof. Accordingly, it is possible to advantageously prevent two external wires 58 from overlapping each other in their insulating coatings and core wire-crimped portions 66, and thus it is possible to advantageously realize reliable fastening and fixing of the connection terminals 62 of two external wires 58 to one external-wire fastening part 36. Furthermore, in the above-described first embodiment, the external-wire fastening part 36 is provided in the corner defined by the side wall 22a serving as the first side wall, and the side wall 22d serving as the second side wall that intersect with each other, and the angle at which the side wall 22a and the side wall 22d intersect with each other may be any angle as long as a corner can be defined, without being limited to 90 degrees, and may be an angle that is more obtuse or acute than 90 degrees. Note that, in the above-described first embodiment, the fastener arranged in the external-wire fastening part 36 is the nut 44, but may also be a bolt or the like.

Figure 7:
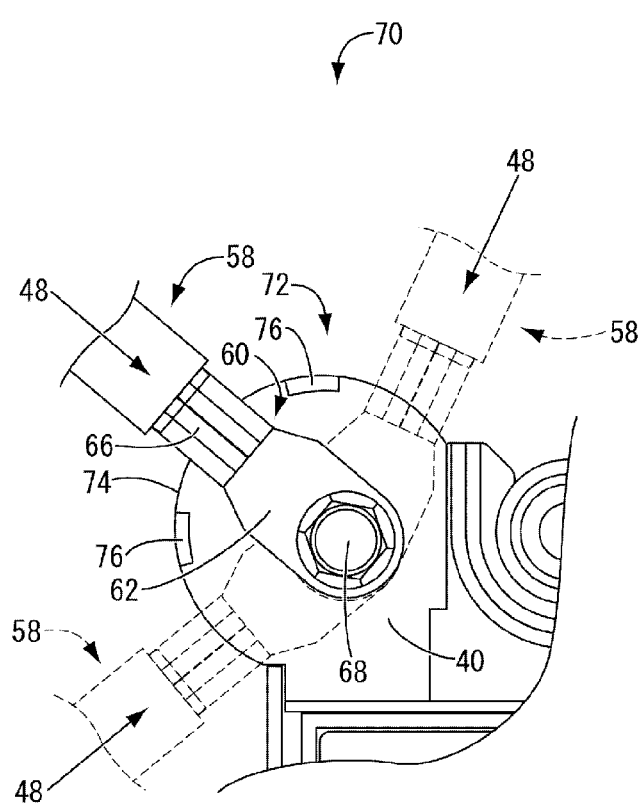
FIG. 7 is an enlarged plan view illustrating one corner of an electrical junction box according to a second embodiment of the present disclosure.

Moreover, for example, as in an electrical junction box 70 according to a second embodiment of the present disclosure shown in FIG. 7, an external-wire fastening part 72 may also be formed as a region that is formed in a corner and has a substantially dome shape when viewed in a plan view. More specifically, the external-wire fastening part 72 is defined by a side wall 74, and the external-wire fastening part 72 has three fastening points 48 oriented in different directions. Also, a partition protrusion 76 in the shape of a substantially rectangular flat plate is provided in each space between the three fastening points 48, the partition protrusions 76 protruding upward from the connection part 40. Therefore, even if the connection direction of an input/output wire serving as the external wire 58 is different depending on the type of vehicle, it is possible to connect the external wire 58 of the connection terminal 62 to the external-wire fastening part 36 from three directions, without changing the shape of the connection terminal of the external wire 58 or changing the direction in which the fastening point of the external-wire fastening part 36 extends, thus making it possible to further improve the versatility of the electrical junction box. Off course, the connection terminals 62 of a plurality of external wires 58 may also be fastened and fixed to one external-wire fastening part 72.

The invention claimed is:

1. An electrical junction box that has a case in which a circuit member is disposed, the case being provided with at least one external-wire fastening part in which a connection part provided on the circuit member is exposed, and to which a connection terminal provided at an end of an external wire is to be fastened and fixed,
    wherein each of the at least one external-wire fastening part has a fastener that is used to fasten and fix the connection terminal to the connection part,
    each of the at least one external-wire fastening part has a plurality of fastening points, and each of the plurality of fastening points are normal to each other and extend from a central axis of the fastener to a peripheral wall of the case have the same length, the plurality of fastening points being oriented in different directions, and
    a plurality of the connection terminals oriented in different directions are to be fastened and fixed to the at least one external-wire fastening part.

2. The electrical junction box according to claim 1, wherein the external-wire fastening part is provided in a corner of the case, the corner is defined by a first side wall and a second side wall that constitute the peripheral wall of the case, and two fastening points are provided as a result of the normals respectively extending from the central axis of the fastener to the first side wall and the second side wall being equal to each other.

3. The electrical junction box according to claim 1, wherein the external-wire fastening part includes a partition protrusion that is located between the plurality of fastening points, and protrudes upward from the connection part, so as to define a pair of slots, each of the slots being orthogonal to each other.

4. The electrical junction box according to claim 2, wherein the external-wire fastening part includes a partition protrusion that is located between the plurality of fastening points, and protrudes upward from the connection part, so as to define a pair of slots, each of the slots being orthogonal to each other.

* * * * *